US010975846B2

(12) United States Patent
Srivastava et al.

(10) Patent No.: US 10,975,846 B2
(45) Date of Patent: Apr. 13, 2021

(54) METHOD AND SYSTEM TO OPTIMIZE AVAILABILITY, TRANSMISSION, AND ACCURACY OF WIND POWER FORECASTS AND SCHEDULES

(71) Applicant: General Electric Company, Schenectady, NY (US)

(72) Inventors: Rahul Kumar Srivastava, Bangalore (IN); Krishna Kumar Swaminathan, Bangalore (IN); Sridhar Dasaratha, Bangalore (IN); Shishir Goel, Bangalore (IN); Milesh Shrichandra Gogad, Gurgaon (IN); Nitika Bhaskar, Bangalore (IN); Pritesh Jain, Bangalore (IN)

(73) Assignee: General Electric Company, Schenectady, NY (US)

( * ) Notice: Subject to any disclaimer, the term of this patent is extended or adjusted under 35 U.S.C. 154(b) by 645 days.

(21) Appl. No.: 15/210,008

(22) Filed: Jul. 14, 2016

(65) Prior Publication Data

US 2017/0030333 A1     Feb. 2, 2017

(30) Foreign Application Priority Data

Jul. 29, 2015    (IN) ............................ 3879/CHE/2015
Oct. 8, 2015    (IN) ............................ 3879/CHE/2015

(51) Int. Cl.
    *F03D 7/04*        (2006.01)
    *G05B 13/02*      (2006.01)
    *H02J 3/38*        (2006.01)

(52) U.S. Cl.
    CPC ........... *F03D 7/048* (2013.01); *G05B 13/026* (2013.01); *H02J 3/386* (2013.01); *H02J 2203/20* (2020.01);

(Continued)

(58) Field of Classification Search
    CPC ........ F03D 7/048; G05B 13/026; H02J 3/386; H02J 2003/007; Y02E 10/763; Y02E 60/76; Y04S 40/22
See application file for complete search history.

(56) References Cited

U.S. PATENT DOCUMENTS 6,925,385 B2    8/2005    Ghosh et al.
6,975,925 B1    12/2005    Barnes et al.
(Continued)

FOREIGN PATENT DOCUMENTS

CN        201413997 Y     2/2010
CN        202391650 U     8/2012
(Continued)

OTHER PUBLICATIONS

Acharya, "Security, protection, and control of power systems with large-scale wind power penetration" PhD Thesis, Iowa State University, 2010.
(Continued)

*Primary Examiner* — Robert E Fennema
*Assistant Examiner* — Jonathan Michael Skrzycki
(74) *Attorney, Agent, or Firm* — Dority & Manning, P.A.

(57) ABSTRACT

The present discussion relates to generating power generation forecasts both on-site and remote to a wind farm, or other intermittent power generation asset, so as to increase the reliability of providing a forecast to interested parties, such as regulatory authorities. Forecasts may be separately generated at both the on-site and remote locations and, if both are available, one is selected for transmission to interested parties, such as regulatory authorities. If, due to circumstances, one forecast is unavailable, the other forecast may be used in its place locally and remotely, communications permitting.

15 Claims, 7 Drawing Sheets

(52) U.S. Cl.
CPC ............... *Y02E 10/76* (2013.01); *Y02E 60/00* (2013.01); *Y04S 40/20* (2013.01)

(56) References Cited

U.S. PATENT DOCUMENTS

| | | |
|---|---|---|
| 7,401,057 B2 | 7/2008 | Eder |
| 7,730,063 B2 | 6/2010 | Eder |
| 8,180,507 B2 | 5/2012 | Dokken |
| 8,600,572 B2 | 12/2013 | Sri-Jayantha |
| 8,761,948 B1 | 6/2014 | Ippolito et al. |
| 8,930,299 B2 | 1/2015 | Pyle et al. |
| 2006/0184473 A1 | 8/2006 | Eder |
| 2008/0228553 A1 | 9/2008 | Bryson et al. |
| 2008/0256069 A1 | 10/2008 | Eder |
| 2010/0236253 A1* | 9/2010 | Adam ............... G06Q 10/04 60/780 |
| 2012/0053983 A1 | 3/2012 | Vittal et al. |
| 2012/0053984 A1 | 3/2012 | Mannar et al. |
| 2012/0158207 A1 | 6/2012 | MacNeille et al. |
| 2012/0159268 A1* | 6/2012 | LeCroy ............... G06F 11/0784 714/57 |
| 2012/0191439 A1* | 7/2012 | Meagher ............... G06F 30/20 703/18 |
| 2012/0210198 A1* | 8/2012 | Gale ............... G06F 11/1679 714/807 |
| 2012/0253532 A1* | 10/2012 | McMullin ............... G06Q 50/06 700/291 |
| 2013/0046492 A1 | 2/2013 | Westergaard |
| 2013/0073223 A1 | 3/2013 | Lapira et al. |
| 2014/0032034 A1 | 1/2014 | Raptopoulos et al. |
| 2014/0039709 A1* | 2/2014 | Steven ............... G06Q 10/06 700/291 |
| 2014/0244188 A1 | 8/2014 | Bai et al. |
| 2014/0337002 A1 | 11/2014 | Manto |
| 2015/0120223 A1* | 4/2015 | Dannecker ......... G06F 17/5009 702/61 |
| 2015/0308704 A1* | 10/2015 | Jung ....................... F24F 11/62 700/276 |

FOREIGN PATENT DOCUMENTS

| | | |
|---|---|---|
| EP | 1906353 A1 | 4/2008 |
| EP | 2506210 A1 | 10/2012 |
| WO | 2011143531 A2 | 11/2011 |

OTHER PUBLICATIONS

Xia et al. "Neuro-fuzzy networks for short-term wind power forecasting", Power System Technology (POWERCON) 2010 International Conference on, pp. 1-5, Oct. 24-28, 2010,Hangzhou.

"Wind Power Forecasting", Indian Wind Turbine Manufacturer's Association Power, Oct. 14, 2011, retrieved from "www.wrldc.com/docs/rec/iwtma_forecasting_14.10.2011.ppt".

"Central Electricity Regulatory Commission", http://www.cercind.gov.in/, Retrieved on Aug. 24, 2015.

European Search Report and Opinion issued in connection with corresponding European Application No. 16181020.5 dated Jan. 24, 2017.

* cited by examiner

METHOD AND SYSTEM TO OPTIMIZE AVAILABILITY, TRANSMISSION, AND ACCURACY OF WIND POWER FORECASTS AND SCHEDULES

BACKGROUND

The subject matter disclosed herein relates to wind power generation systems, and more specifically to the optimization of communicating wind power forecasts to remote locations.

A power grid may include a wind power generation system suitable for providing power, such as electrical power, based on wind currents. Wind currents may vary depending on weather conditions, and thus the wind power generation system may provide for more or less power depending on the weather conditions. For example, during peak wind conditions, the wind power generation system may provide for above-average electric power. Likewise, decreases in wind may result in reduced electric power provided to the power grid. Similarly the operational state of a given turbine or set of turbines may affect the amount of power that may be generated at a given time and site location.

As such wind turbine installations typically provide power to a larger power grid infrastructure, it may be desirable to be able to provide forecasts of expected wind power generation so other power generating assets can be operated or prepared to provide any additional needed power. Indeed, in some regulatory structures, providing such forecasts may be encouraged, or even required, to maintain power grid efficiency.

By way of example, In India, the Central Electricity Regulatory Commission (CERC), requires wind farms to schedule their generation in 15 minute intervals, one day in advance. It allows schedules to be updated 16 times a day which is applicable from the $4^{th}$ time block from when it was submitted, through a Coordinating Agency (CA) appointed by the wind farm generator. It stipulates that, if actual generation is beyond +/−15% of the schedule, deviation charges shall be payable to/receivable by the CA for the concerned generator. The deviation charges are error (%) dependent in actual and scheduled generation during the 15 minute interval, calculated as (Actual Generation-Scheduled Generation)/(Available Capacity) X 100.

In such a scenario, one challenge to generating accurate forecasts and submitting schedules to relevant regulatory authorities or other entities is availability of the wind farm's communication connectivity. Wind farms are often located in remote areas where communication networks may not be reliable. Forecasting of wind farm power is typically either done either locally by moderately sophisticated computing equipment or remotely by highly sophisticated computing equipment. In either option, if the wind farm cannot transmit either forecast data to the regulator or operational data information to the remote computing equipment, forecasts may not be generated or may not be generated with sufficient accuracy.

BRIEF DESCRIPTION

Embodiments of the present invention employ a combination of forecasting software, algorithms, hardware and other equipment located both on site at the wind farm and remote (i.e., off-site) from the wind farm to provide improved communication reliability and/or accuracy or quality of wind power forecast at a higher availability rate to customers/regulators and wind farm systems.

In one embodiment, a power generation architecture is provided. In accordance with this embodiment, the power generation architecture includes: one or more intermittent power generating assets located at a first site; a local forecasting system located at the first site, wherein the local forecasting system generates a first set of periodic forecasts of future power generation by the one or more intermittent power generating assets; a remote forecasting system located at a second site remote from the first site, wherein the remote forecasting system generates a second set of periodic forecasts of future power generation by the one or more intermittent power generating assets; a communication network connecting the first site and the second site; and a selection algorithm executing on processor-based systems at one or both of the first site and the second site, wherein the selection algorithm selects a forecast generated by the local forecasting system or the remote forecasting system for a given forecast period and forwards the forecast to a third party.

In a further embodiment, a method for distributing power generation forecasts is provided. In accordance with this embodiment, operational data for one or more wind turbines located at a local site is provided to a local forecasting system at the local site. The local forecasting system generates a first set of periodic forecasts based on the operational data. Over a communication network, the operational data for the one or more wind turbines is provided to a remote forecasting system not located at the local site. The remote forecasting system generates a second set of periodic forecasts based on the operational data. Based on the operational status of one or more of the communication network, the local forecasting system, and the remote forecasting system, a selected forecast generated by one of the local forecasting system or the remote forecasting system is transmitted to a third party.

In another embodiment, a power generation architecture is provided. In accordance with this embodiment, the power generation architecture includes: one or more wind turbines located at a wind farm site; a local forecasting system located at the wind farm site, wherein the local forecasting system generates a first set of periodic forecasts of future power generation by the one or more wind turbines; a remote forecasting system located at a second site remote from the wind turbine site, wherein the remote forecasting system generates a second set of periodic forecasts of future power generation by the one or more wind turbines; a communication network connecting the wind turbine site and the second site; and a selection algorithm executing on processor-based systems at one or both of the wind turbine site and the second site, wherein the selection algorithm selects a forecast generated by the local forecasting system or the remote forecasting system for a given forecast period and forwards the forecast at least to a regulatory authority.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. In the development of any such actual implementation, as in any engineering or design project, numerous implementation-specific decisions must be made to achieve the developers' specific goals, such as compliance with system-related and business-related constraints, which may vary from one implementation to another. Such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure describes techniques for communicating forecast data to a regulatory authority or other entity expecting to receive wind generation forecasts or forecasts related to other intermittent power generation assets. In one embodiment, this may involve providing separate forecasting functionality at both an on-site (e.g., a wind farm) and an off-site (i.e., at a location other than the wind farm, including a virtualized computing environment or server farm) location, with various scenarios controlling which location is tasked with providing forecast to the forecast receiving authority. Though wind power generation is primarily discussed herein by way of example and to facilitate explanation, other intermittent or varying power generation technologies or assets may benefit from the present approaches.

Figure 1:
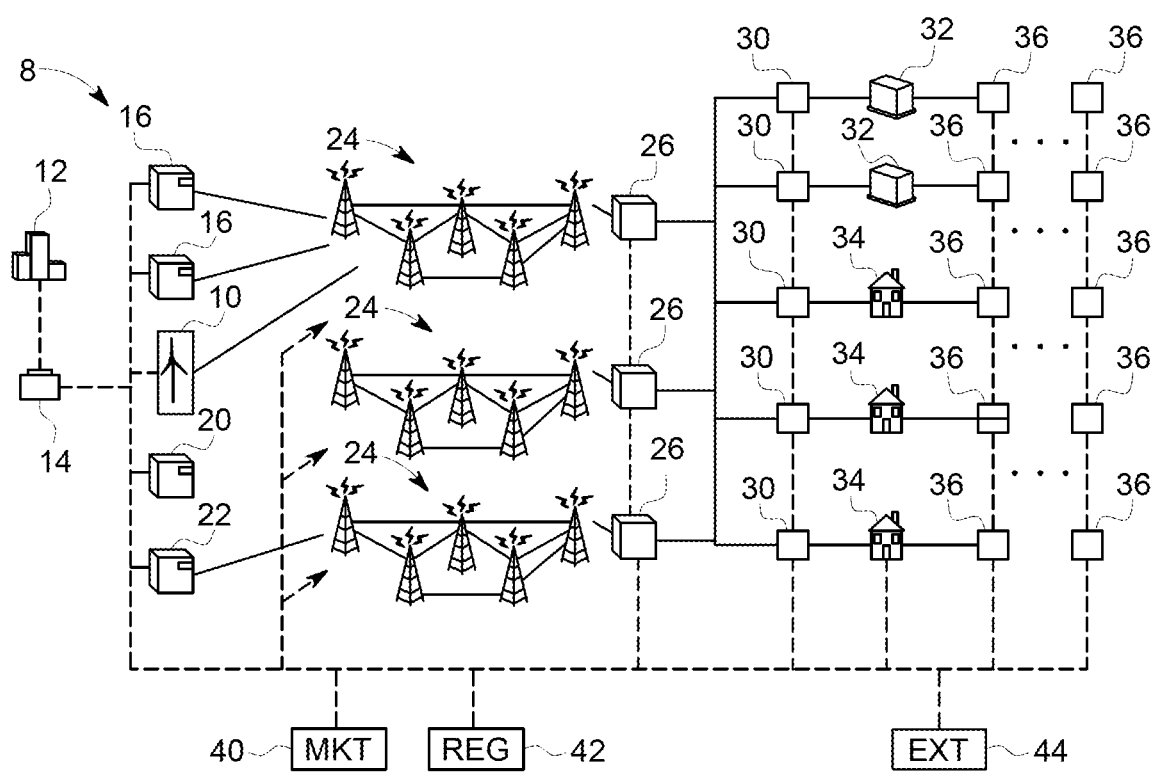
FIG. 1 is a block diagram of an embodiment of a power generation, transmission, and distribution system which includes a wind power generation system.

With the foregoing in mind, it may be useful to describe an embodiment of a wind generation system and connected infrastructure that incorporates the techniques described herein, such as a power grid system 8 illustrated in FIG. 1. The power grid 8 may include a wind power system or "wind farm" 10. In use, the wind power system 10 may convert kinetic energy from the wind into electrical power. The electrical power may then be delivered via power grid system 8 to customers of an electrical utility.

For example, the power grid system 8 may include one or more utilities 12. The utility 12 may provide for power production and oversight operations of the power grid system 8. Utility control centers 14 may monitor and direct power produced by one or more power generation stations 16 and wind power systems 10. The power generation stations 16 may include conventional power generation stations, such as power generation stations using gas, coal, biomass, and other carbonaceous products for fuel. The power generation stations 16 may additionally include alternative power generation stations using solar power, hydroelectric power, geothermal power, and other alternative sources of power (e.g., renewable energy) to produce electricity. Other infrastructure components may include a water power producing plant 20 and geothermal power producing plant 22. For example, water power producing plants 20 may provide for hydroelectric power generation, and geothermal power producing plants 22 may provide for geothermal power generation.

The power generated by the power generation stations 16, 18, 20, and 22 may be transmitted through a power transmission grid 24. The power transmission grid 24 may cover a broad geographic region or regions, such as one or more municipalities, states, or countries. In the depicted embodiment, the power transmission grid 24 may be electrically coupled to distribution systems (e.g., power distribution substation 26). The power distribution substation 26 may include transformers to transform the voltage of the incoming power from a transmission voltage (e.g., 765 kV, 500 kV, 345 kV, or 138 kV) to primary (e.g., 13.8 kV or 4160V) and secondary (e.g., 480V, 230V, or 120V) distribution voltages. Metering infrastructure (i.e., meters 30) may be used to monitor and communicate power related information based on electric power delivered to commercial consumers 32 and residential consumers 34. The customers 32, 34 may operate a variety of power consuming devices 36, such as household appliances, industrial machinery, communications equipment, and the like.

As mentioned earlier the wind power system 10 may be used as a source of electrical power based on the kinetic energy of wind. Because of wind fluctuations, system maintenance, and/or system equipment variations, the electrical power delivered via the wind power system 10 may also fluctuate. For example, gusty conditions may increase electrical power, while low or no wind conditions may reduce the electrical power produced via the wind power system 10. The grid system 8 may operate more efficiently if the wind power system 10 provides accurate and timely forecasts of upcoming power production. As noted herein, in some jurisdictions, such power forecasting is regulated via the regulatory systems 42 to occur, for example, at certain time periods such as every 30 minutes, every hour, every 3 hours, every 8 hours, every day, and so on. External systems 44 are also depicted, which may include energy markets, energy credit entities (e.g., "green" credits), insurance entities, and the like. Improved power production forecasting and/or reporting for the wind power system 10 may enable more accurate trading of energy credits, improved pricing of energy, and lower insurance rates. The techniques described herein provide for systems and methods that may more accurately predict and/or report upcoming power production for the wind power system 10, regardless of the communication state between the local power system 10 and the remote entities. By more accurately predicting and reporting future power production, the grid system 8 may manage power in a more efficient and timely manner.

As discussed herein one or more forecasting engines may be employed, such as local to and remote from the wind farm 10, to derive power generation forecasts. The forecasts (for a particular time or over a particular time period) may include predicted electrical power generation (e.g., total power production, amperage, voltage, frequency) by one or more individual wind turbine systems and/or for all or part of a wind farm 10. The forecasting engine, as discussed herein, may be communicatively coupled to various grid system 8 entities, such as the regulatory entity 42, utilities 12, external systems 44, and the like, and may provide the forecasts 86 to these grid system 8 entities. For example, forecasts generated by the forecasting engine may be provided to a regulatory authority to meet regulatory requirements. Meeting accuracy goals may result in monetary incentives, while monetary penalties may be levied if accuracy goals are not met. The forecasts may be provided one or multiple times every day and may allow for regular updating to the provided forecasts.

Figure 2:
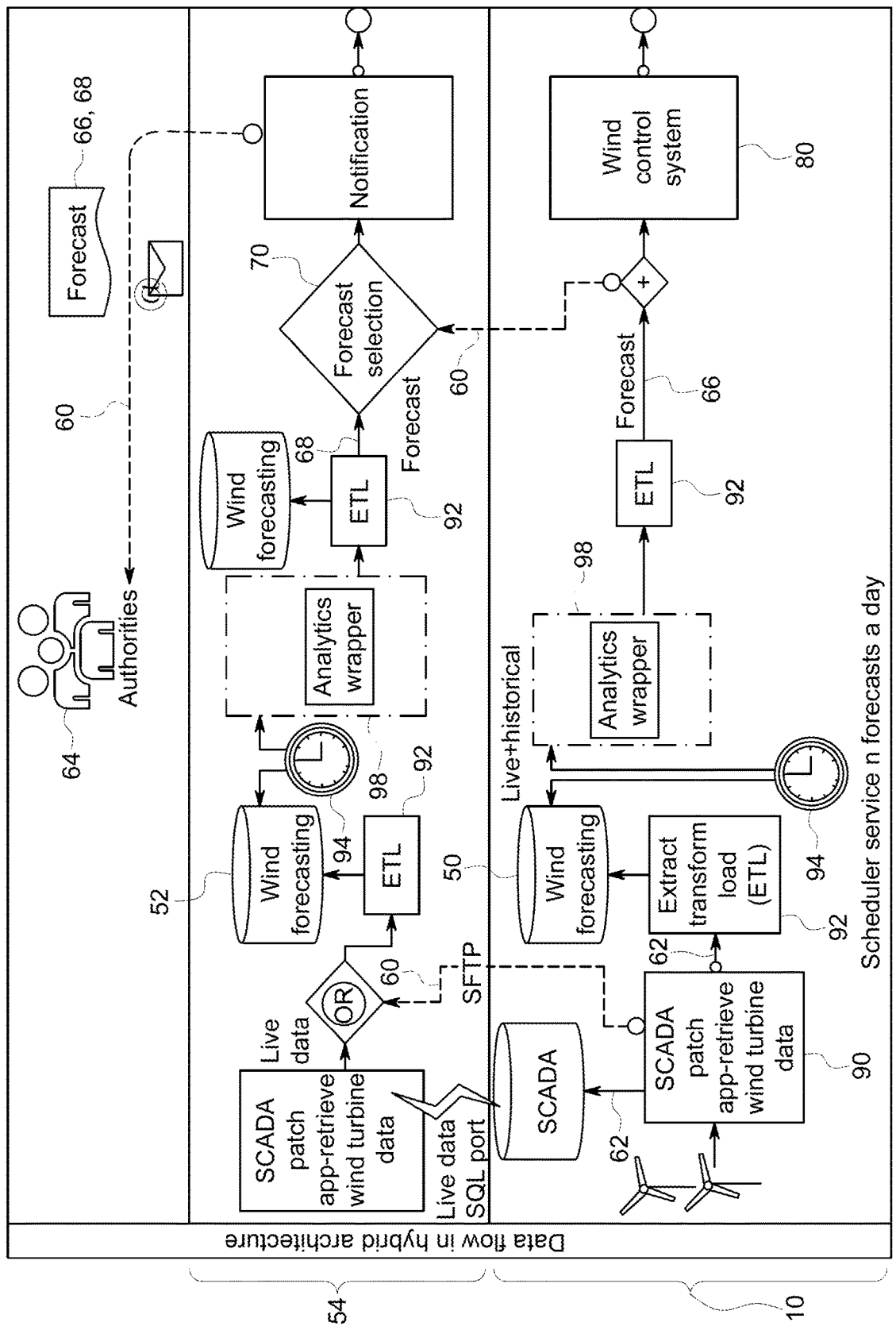
FIG. 2 is a schematic diagram of a wind farm, on site forecasting system, off-site forecasting system, and communication system.

With the preceding in mind, and turning to FIG. 2, an embodiment, of a local forecasting system 50 is depicted deployed at a wind farm 10 to forecast the wind farm power generation, and a remote forecasting system 52 is deployed at a remote location 54, such as a server farm or virtualized environment (e.g., the cloud or other network accessible processing infrastructure) remote from the wind farm 10, to generate forecasts of the power generation for the wind farm 10 separate from those generated by the local forecasting system 50.

One or more communication systems 60 (such as an internet protocol or other packet-based protocol, secure file transfer protocol (SFTP), file transfer protocol (FTP), and so forth) may be used to transmit data (including, but not limited to, forecasts 66, wind turbine status and maintenance data 62, local weather condition data, and so forth) between the local and remote forecasting systems 50, 52 and to a relevant destination 64 (e.g., regulatory authorities).

The forecasting systems 50, 52 may include computer workstations and/or servers, forecasting software, databases, forecasting analytics and/or algorithms, for example. That is, the respective forecasting systems 50, 52 may each include respective processor-based systems programmed to access relevant forecasting inputs (e.g., local weather conditions and forecast weather conditions, status and maintenance details for turbines within the farm 10, and so forth) and to execute one or more forecasting algorithms based on the available inputs to generate separate respective forecasts local to and remote from the wind farm 10. The local forecasting system 50 may be deployed at the wind farm 10 in the same network as other systems of the wind farm 10. In general, the local and remote forecasting systems 50, 52 may be deployed on different networks.

Though the manner in which the respective forecasts 66, 68 are generated is not central to the present discussion, a brief example is provided herein to provide useful context. By way of example, at the local site (i.e., wind farm 10), SCADA (supervisory control and data acquisition) protocols 90 may run as part of the ongoing oversight of the wind farm 10, yielding wind turbine data 62. The SCADA data may be provided in real-time, as periodic updates, or in batch form to the remote location 54 for processing. In practice, the local site 10 may have access to a more complete or more current set of the SCADA data 62.

A transform load extraction process (ETL) 92 may be performed using the SCADA data 62 at one or both of the local and remote sites 10, 54 and the transform load data utilized by the local and/or remote forecasting component 50, 52. A scheduler service 94 may be employed to use this data to generate forecasts on a set schedule. Outputs of these processes may in turn be provided to a forecasting analytics component 98 which in turn outputs analytics that can be used in the generation of a forecast 66 at the local site or forecast 68 at the remote site. Though not shown, copies of the forecasts 66, 68 may be written to one or more directories or folders in the wind farm 10 server environment for use or archiving at the wind farm 10, such as for use by the wind control system 80.

As discussed herein, the local and remote forecasting systems 50, 52 may operate separately and/or in parallel, so that even when communications between the local and remote sites are interrupted or absent, the remote system 52, based on the available and/or most recent data, may generate a forecast 68 for submission to the regulatory authorities or other interested entity 64. Thus, when communications between the local and remote sites 10, 54 are intact, and current weather and/or turbine status data is available to the remote forecasting system 52, the forecasts generated by the local and remote forecasting systems 50, 52 may be substantially similar, if not identical. Conversely, when communications between the local and remote forecasting systems 50, 52 are impaired or absent, the remote forecasting system 52 may generate a forecast based on the most current weather and/or turbine status data available, which may be out-of-date, resulting in the forecasts generated by the local and remote forecasting systems 50, 52 possibly differing. It should be noted that in certain implementations, where communications are absent or impaired form the wind farm 10, an advisory or other additional notification may be provided along with the remotely-generated forecast 68 to provide notification that local data was unavailable at the time the forecast 68 was generated.

The dual forecasting approach described herein, therefore, allows for forecasts to be provided to a downstream entity, such as a regulatory authority, even in the event of communication failure or computer failure at the wind farm 10. A number of possible scenarios, outlined in table 1 and schematically illustrated in FIGS. 3-7 are described below to provide further context.

TABLE 1

| Scenario # | On-Site System Status | Remote System Status | Communication Network Status at Wind Farm | Forecast Transmission, External | Forecast Transmission, Internal |
|---|---|---|---|---|---|
| 1 | Online | Online | Online | Rules-Based | Rules-Based |
| 2 | Online | Online | Offline | Remote | Local |
| 3 | Offline | Online | Online | Remote | Remote |
| 4 | Offline | Online | Offline | Remote | None |
| 5 | Online | Offline | Online | Local | Local |

Figure 3:
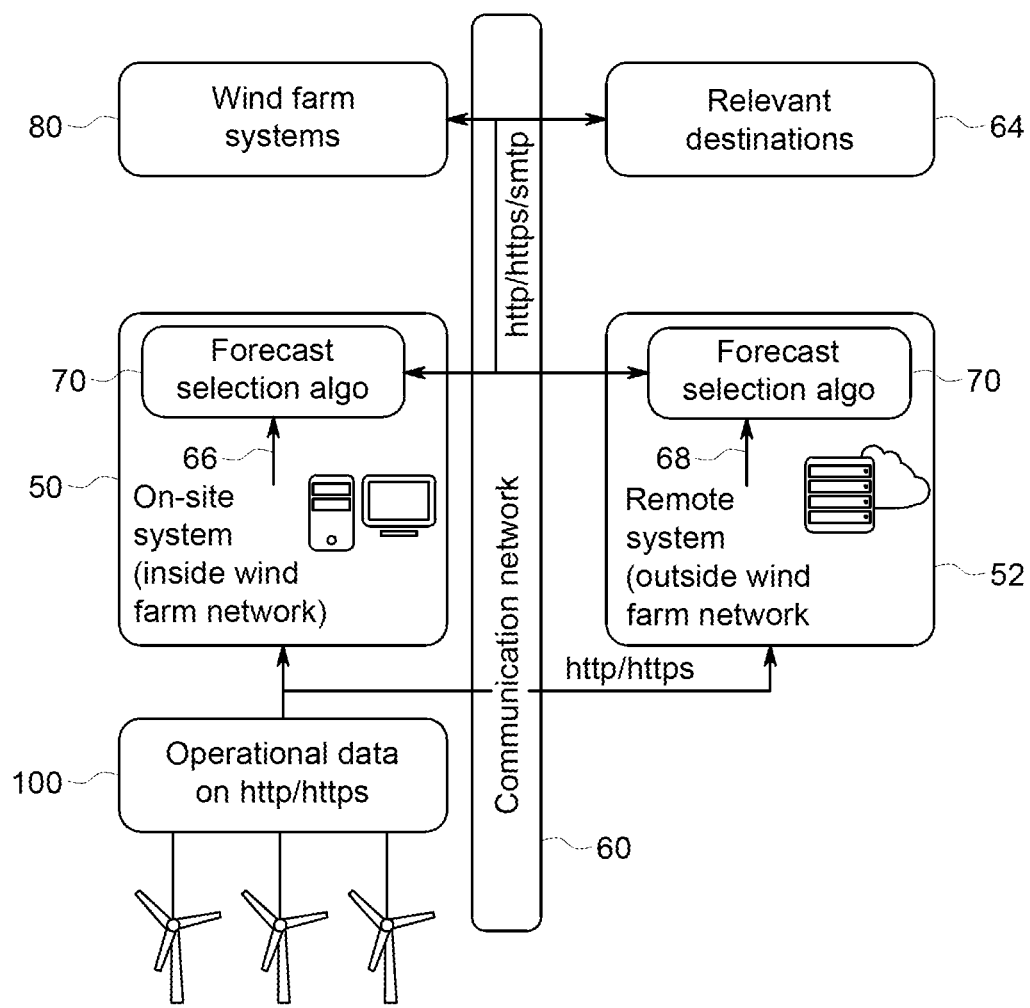
FIG. 3 is an operational overview of a scenario in which communications and on-site and remote forecasting are operational, in accordance with aspects of the present disclosure.

Turning to Scenario 1 and FIG. 3, in one embodiment, when forecasting systems 50 and 52 and communication system 60 are fully operational the following steps occur. First, locally obtained data 100 and local forecast information 66 (i.e., the forecast generated by the local forecasting system 50) are sent from local forecasting system 50 to remote forecasting system 52. Remote forecasting system 52 uses locally obtained data 100 and local forecast information 66 to generate remote forecast information 68 (i.e., the forecast generated by the remote forecasting system 52). In one embodiment, locally obtained data 100 comprises operational data from the wind farm 10 such as wind speed and direction, power, operating state, availability, maintenance schedules, and other parameters. Near real time operational data may be obtained from wind farm SCADA (supervisory control and data acquisition) software or from the turbines directly. Deferred operational data may also be obtained (by either forecasting system 50, 52) from a remote database such as global data repository, for example.

When both forecasting systems 50, 52 are operational, either local or remote forecast information 66, 68 may be sent to an interested party 64, such as regulatory authority) or may be utilized for various purposes, including control purposes (i.e., wind farm control system 80). In one embodiment, remote forecasting system 52 is configured to include a forecast selection algorithm 70, such as a rules-based selection algorithm, that assesses which forecast (i.e., locally-generated forecast 66 or remotely-generated forecast 68) is more reliable at a given point in time, with the forecast assessed to be more reliable being forwarded to the relevant destination 64 (e.g., a regulatory authority) or other interested party and/or back to the wind farm 10 in certain scenarios. Thus, in this example, if the forecast selection algorithm 70 determines that the remote forecast information 68 is more reliable, the remote forecast 68 may be sent back to the wind farm 10 for use by a wind farm control system 80. Factors that may be utilized by the selection algorithm 70 may include, but are not limited to, completeness of the data used in generating a respective forecast, recency of the data used in generating a respective forecast, quality or error issues in the data used in generating a respective forecast, and so forth.

One example of a situation where a locally-generated forecast 66 is typically expected to be more reliable than a remotely-generated forecast 68 occurs when the local forecasting system 50 has access to more current and/or more frequently updated wind farm operational data 100. For example, in one implementation the wind farm operational data 100 available to the local forecasting system 50 may be polled at shorter intervals (such as 1 second, or 1 minute), i.e. at a higher frequency relative to that available to the remote forecasting system 52. In this scenario, the higher resolution of operational data available to the local forecasting system 50 may yield a more reliable forecast 66 and schedule quality than that generated by the remote forecasting system 52 which relies on more sparse and/or less robust operational data.

In another embodiment the forecast selection algorithm 70 has access to previous forecasts generated by both the local and remote forecasting systems 50, 52. In such a scenario, the selection algorithm 70 may use this historic data in conjunction with actual power output data to gauge how well the forecasting is being performed at both the local and remote forecasting systems 50, 52. That is, an aspect of the selection algorithm 70 operation may be to evaluate the performance of the local and remote forecasting systems 50 and 52 by comparing their predicted power generation for a given time or times with the actual or observed power generation at the corresponding times. For example, if in the previous time intervals closest to the next forecast generation interval one of the forecasting systems 50, 52 was closer to the actual observed power generation, the forecast selection algorithm 70 may select the forecast from the forecasting system that was more recently accurate and/or may more highly weight the selection process to account for the more recent accurate forecast.

Figure 4:
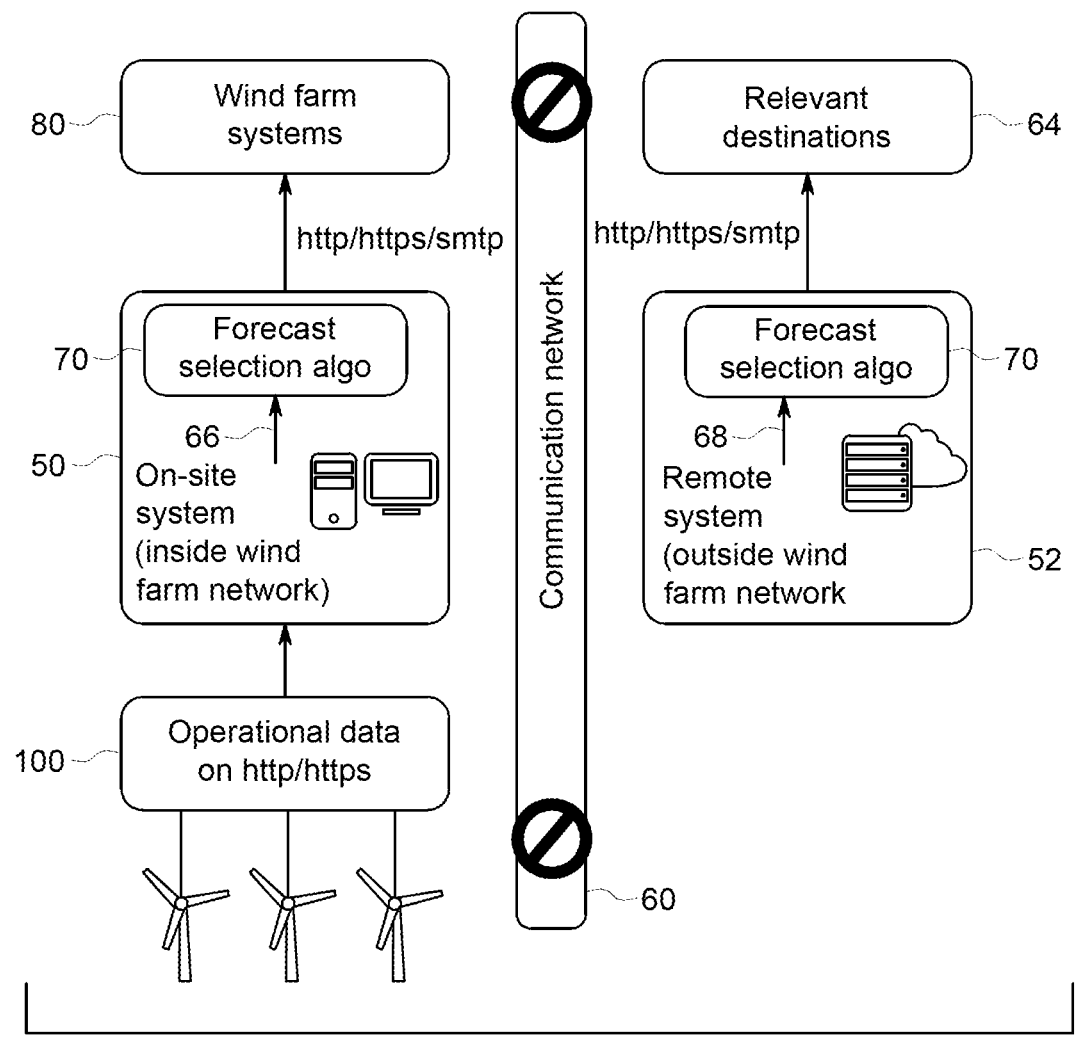
FIG. 4 is an operational overview of a scenario in which communications is offline and on-site and remote forecasting are operational, in accordance with aspects of the present disclosure.

Turning to Scenario 2 and FIG. 4, in a scenario in which both forecasting systems 50 and 52 are operational, but the communications system 60 between the forecasting systems 50 and 52 is not operational, then the local forecasting system 50 continues to generate local forecast information 66 for use by locally by the wind control system 80. The remote forecasting system 52 will not have access to this information due to the lack of communication but may still be able to separately generate forecast information 68 (which may differ from the locally-generated forecast 66). In such a scenario, the remotely-generated forecast 68 may be generated using data from a remote database and/or extrapolated data from earlier obtained local operational data, even in the absence of live data from the wind farm 10. This remotely-generated forecast information 68 may then be sent to interested parties 64, including regulatory authorities. In one embodiment, the forecast selection algorithm 70 may be set to automatically provide the remote forecast information 68 to the regulatory authority 64 in the event of a communications issue between the local and remote forecasting systems 50, 52. Once the communications are restored, it may be useful for the SCADA systems to recover and populate any data that was not transmitted due to communication outages for both the on-site and remote systems 50, 52. This synchronization step may help improve the accuracy or quality of wind power forecasts and schedules.

Figure 5:
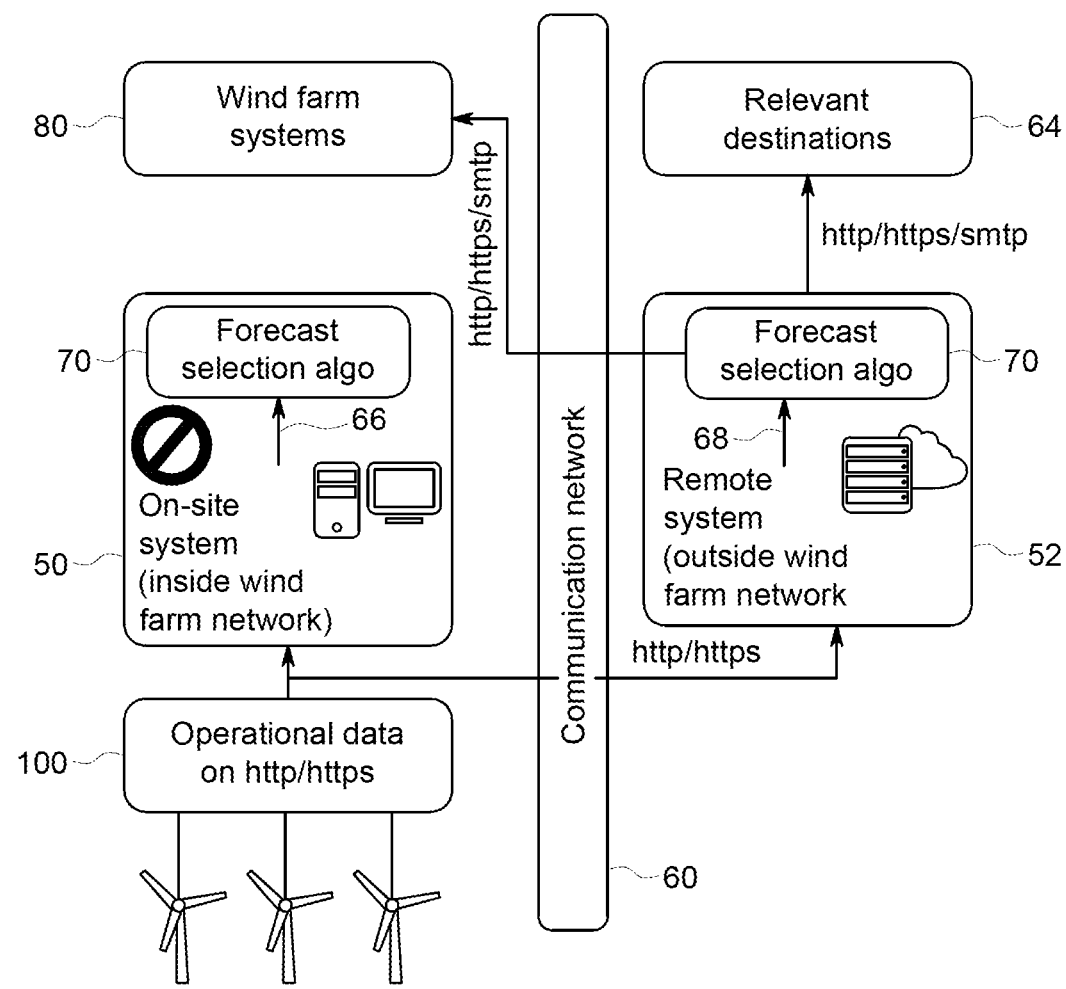
FIG. 5 is an operational overview of a scenario in which communications and remote forecasting are operational but on-site forecasting is offline, in accordance with aspects of the present disclosure.

Turning to Scenario 3 and FIG. 5, if the local forecasting system 50 is not operational, but the remote forecasting system 52 and the communications system 60 between the forecasting systems 50 and 52 are both operational, then the remote forecasting system 52 may share remotely-generated forecast information 68 with both the downstream interested parties 64 (e.g., a regulatory authority) and with the wind farm 10 for use by wind farm control system 80. Thus, in such a scenario, a remotely-generated forecast 68 may be uploaded to (or otherwise communicated to) the wind farm 10 and used to control on-site operations at the wind farm 10.

Figure 6:
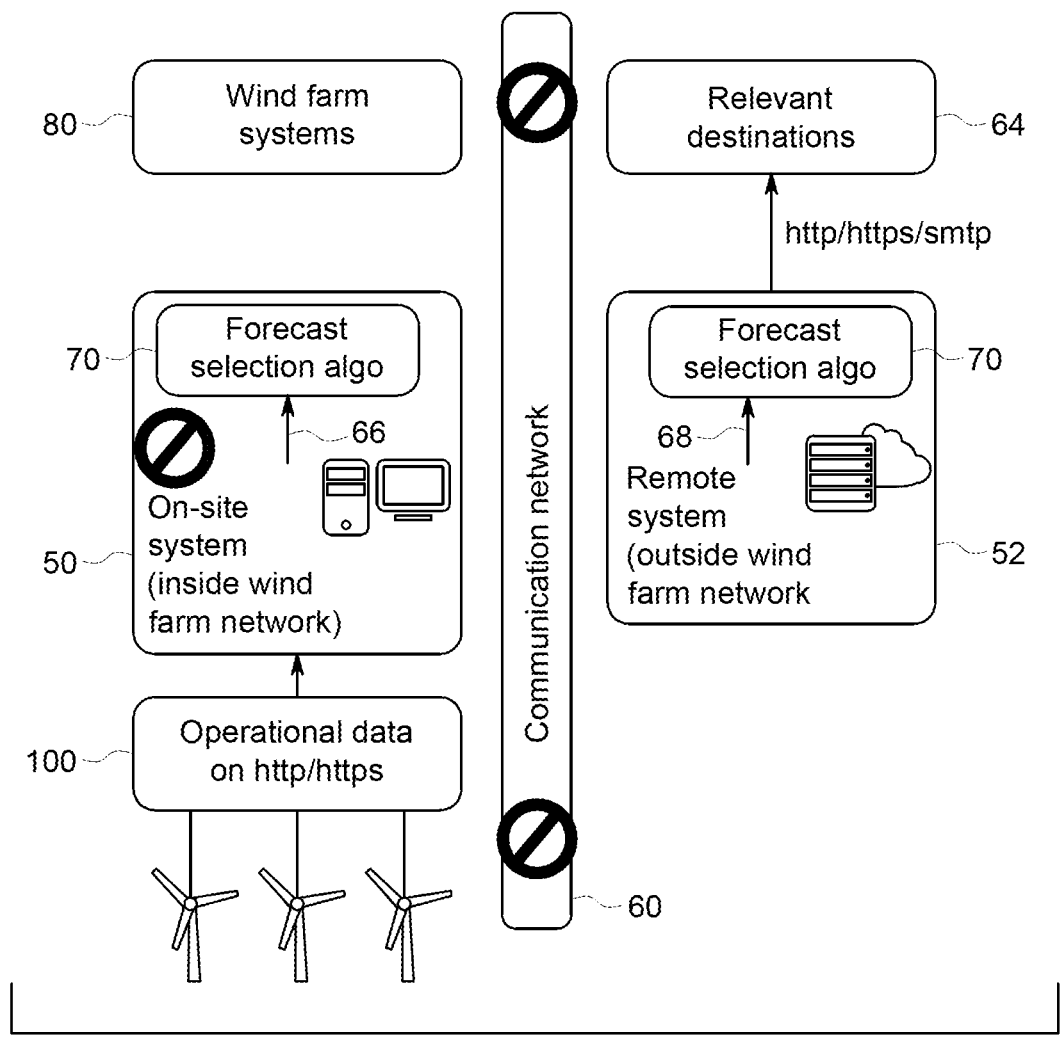
FIG. 6 is an operational overview of a scenario in which communications and on-site forecasting are offline but remote forecasting is operational, in accordance with aspects of the present disclosure.

Turning to Scenario 4 and FIG. 6, if the local forecasting system 50 and the communications system 60 between the forecasting systems 50 and 52 are both not operational (i.e., offline), but the remote forecasting system 52 is operational, then the remote forecasting system 52 will continue to operate and share remotely-generated forecast information 68 with interested parties 64 (i.e., a regulatory authority). However, no forecast information will be available to wind farm control 80 in this scenario.

Figure 7:
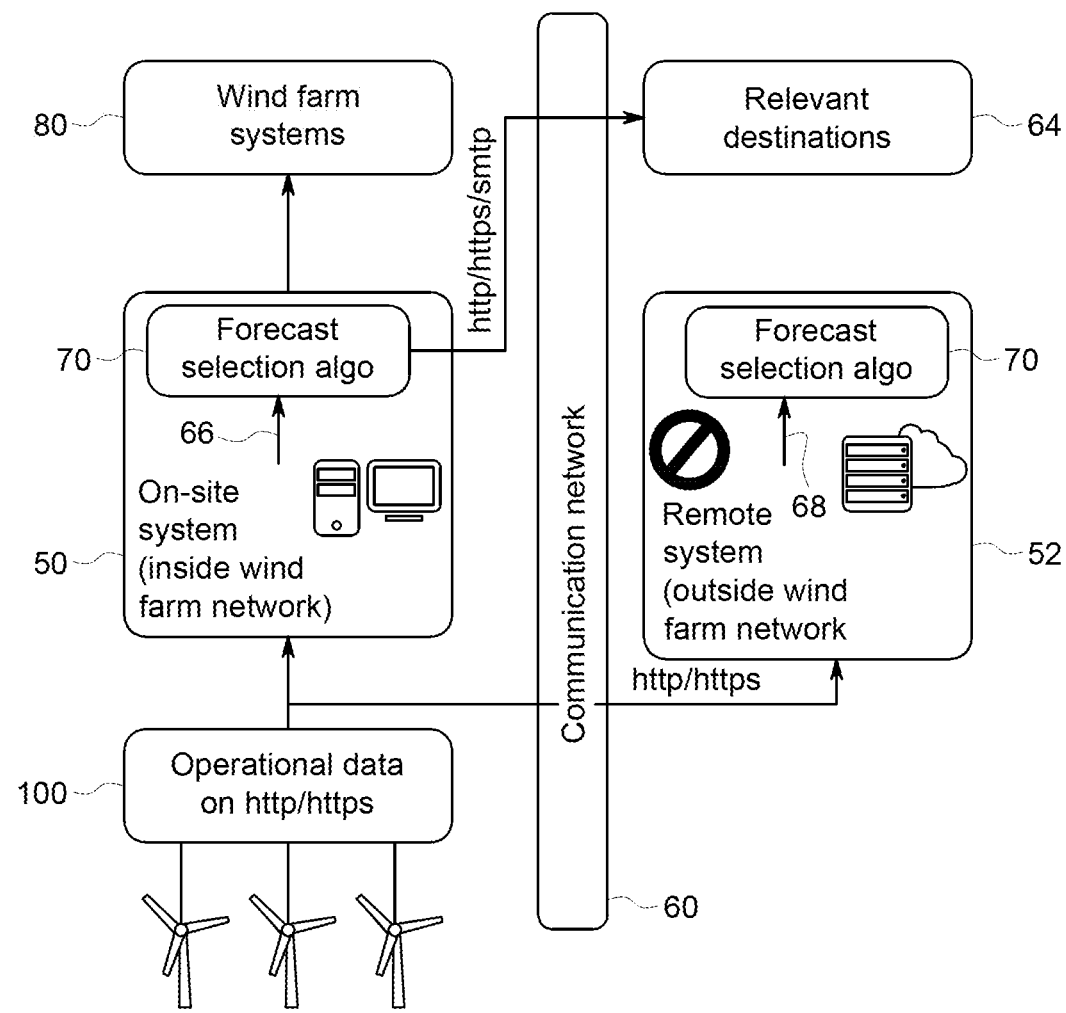
FIG. 7 is an operational overview of a scenario in which communications and on-site forecasting are operational but remote forecasting is offline, in accordance with aspects of the present disclosure.

Conversely, and turning to Scenario 5 and FIG. 7, if the local forecasting system 50 and the communications system 60 between the forecasting systems 50 and 52 are operational, but the remote forecasting system 52 is not operational, then the local system 50 will share locally-generated forecast information 66 with regulatory authority (or other interested entity 64), either directly through a separate communication channel or indirectly through a channel including the remote location 54. In such a scenario, the locally-generated forecast information 66 is also used on-site at the wind farm control system 80.

It is only when both the local and remote forecasting systems 50, 52 are both down (i.e., when no system is online to generate a forecast) that no forecast information is provided to the regulatory authority or other interested party 64.

Technical effects of the invention include generating power generation forecasts both on-site and remote to a wind farm (or other intermittent power generation technology) so as to increase the reliability of providing a forecast to interested parties, such as regulatory authorities. Forecasts may be separately generated at both the on-site and remote locations and, if both are available, one is selected for transmission to interested parties, such as regulatory authorities. If, due to circumstances, one forecast is unavailable, the other forecast may be used in its place locally and remotely, communications permitting.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power generation architecture, comprising:
    one or more intermittent power generating assets located at a first site;
    a local forecasting system located at the first site and comprising a first local area network connected to the one or more power generating assets, wherein the first local area network generates a first set of periodic forecasts of future power generation by the one or more intermittent power generating assets;
    a remote forecasting system located at a second site remote from the first site and comprising a second local area network separate from the first local area network, wherein the second local area network comprises a cloud processing infrastructure that generates a second set of periodic forecasts of future power generation by the one or more intermittent power generating assets, the first and second local area networks operating independently from each other and in parallel, the second set of periodic forecasts of future power generation being generated separately from the first set of periodic forecasts of future power generation using the same current available input data;
    an Internet-based communication network connecting the first and second local area networks;
    a selection algorithm executing on processor-based systems at one or both of the first site and the second site, wherein the selection algorithm selects a forecast generated by the local forecasting system or the remote forecasting system for a given forecast period and forwards the selected forecast to a regulatory authority; and
    a local control system at the first site for controlling the intermittent power generating assets according to the selected forecast,
    wherein, when the local forecasting system is inoperative, the selection algorithm forwards a remotely-generated forecast generated by the remote forecasting system to the local control system located at the first site and to the regulatory authority.

2. The power generation architecture of claim 1, wherein the one or more intermittent power generating assets comprise one or more wind turbines.

3. The power generation architecture of claim 1, wherein the selection algorithm comprises a rules-based selection algorithm.

4. The power generation architecture of claim 1, wherein the selection algorithm evaluates reliability of a locally-generated forecast generated by the local forecasting system and of a remotely-generated forecast generated by the remote forecasting system as part of the selection process.

5. The power generation architecture of claim 1, wherein, when the communication network is inoperative, the selection algorithm forwards a locally-generated forecast generated by the local forecasting system to the local control system located at the first site and forwards a remotely-generated forecast generated by the remote forecasting system to the regulatory authority.

6. The power generation architecture of claim 1, wherein, when the communication network and local forecasting system are inoperative, the selection algorithm forwards a remotely-generated forecast generated by the remote forecasting system to the regulatory authority.

7. The power generation architecture of claim 1, wherein, when the remote forecasting system is inoperative, the selection algorithm forwards a locally-generated forecast generated by the local forecasting system to a control system located at the first site and to the regulatory authority.

8. A method for distributing power generation forecasts, comprising:
    providing operational data for one or more wind turbines located at a local site to a local forecasting system at the local site and comprising a first local area network connected to the one or more wind turbines, wherein the first local area network generates a first set of periodic forecasts based on the operational data;
    providing, over an Internet-based communication network, the operational data for the one or more wind turbines to a remote forecasting system not located at the local site and comprising a second local area network separate from the first local area network, wherein the second local area network comprises a cloud processing infrastructure that generates a second set of periodic forecasts based on the operational data, the first and second local area networks operating independently from each other and in parallel, the second set of periodic forecasts of future power generation being generated separately from the first set of periodic forecasts of future power generation using the same current available input data;
    based on the operational status of one or more of the communication network, the local forecasting system, and the remote forecasting system, transmitting a selected forecast generated by one of the local forecasting system or the remote forecasting system to a regulatory authority; and
    controlling, via a local control system at the first site, the one or more wind turbines according to the selected forecast,
    wherein, when the local forecasting system is inoperative, the method further comprises forwarding a remotely-generated forecast generated by the remote forecasting system to the local control system at the first site and to the regulatory authority.

9. The method of claim 8, wherein, when the communication network is inoperative, a locally-generated forecast generated by the local forecasting system is transmitted to a control system located at the local site and a remotely-generated forecast generated by the remote forecasting system is transmitted to the regulatory authority.

10. The method of claim 8, wherein, when the communication network and local forecasting system are inoperative, a remotely-generated forecast generated by the remote forecasting system is transmitted to the regulatory authority.

11. The method of claim 8, wherein, when the remote forecasting system is inoperative, a locally-generated forecast generated by the local forecasting system is transmitted to a control system located at the first site and to the regulatory authority.

12. A power generation architecture, comprising:
one or more wind turbines located at a wind farm site;
a local forecasting system located at the wind farm site and comprising a first local area network connected to the one or more wind turbines, wherein the first local area network generates a first set of periodic forecasts of future power generation by the one or more wind turbines;
a remote forecasting system located at a second site remote from the wind turbine site and comprising a second local area network separate from the first local area network, wherein the second local area network comprises a cloud processing infrastructure that generates a second set of periodic forecasts of future power generation by the one or more wind turbines, the first and second local area networks operating independently from each other and in parallel, the second set of periodic forecasts of future power generation being generated separately from the first set of periodic forecasts of future power generation using the same current available input data;
an Internet-based communication network connecting the first and second local area networks;
a selection algorithm executing on processor-based systems at one or both of the wind turbine site and the second site, wherein the selection algorithm selects a forecast generated by the local forecasting system or the remote forecasting system for a given forecast period and forwards the selected forecast at least to a regulatory authority; and
a local control system at the first site for controlling the intermittent power generating assets according to the selected forecast,
wherein, when the local forecasting system is inoperative, the selection algorithm forwards a remotely-generated forecast generated by the remote forecasting system to the local control system located at the first site and to the regulatory authority.

13. The power generation architecture of claim 12, wherein, when the communication network is inoperative, the selection algorithm forwards a locally-generated forecast generated by the local forecasting system to a control system located at the wind farm site and forwards a remotely-generated forecast generated by the remote forecasting system to the regulatory authority.

14. The power generation architecture of claim 12, wherein, when the communication network and local forecasting system are inoperative, the selection algorithm forwards a remotely-generated forecast generated by the remote forecasting system to the regulatory authority.

15. The power generation architecture of claim 12, wherein, when the remote forecasting system is inoperative, the selection algorithm forwards a locally-generated forecast generated by the local forecasting system to a control system located at the wind farm site and to the regulatory authority.

* * * * *